June 1, 1965 R. TAYLOR 3,186,916
SOLID MODERATOR CORE STRUCTURES FOR NUCLEAR REACTORS
Filed Sept. 27, 1960 8 Sheets-Sheet 1

June 1, 1965    R. TAYLOR    3,186,916
SOLID MODERATOR CORE STRUCTURES FOR NUCLEAR REACTORS
Filed Sept. 27, 1960    8 Sheets-Sheet 4

Fig. 6.    REFLECTOR    ACTIVE CORE

June 1, 1965   R. TAYLOR   3,186,916
SOLID MODERATOR CORE STRUCTURES FOR NUCLEAR REACTORS
Filed Sept. 27, 1960   8 Sheets-Sheet 5

June 1, 1965   R. TAYLOR   3,186,916
SOLID MODERATOR CORE STRUCTURES FOR NUCLEAR REACTORS
Filed Sept. 27, 1960   8 Sheets-Sheet 6

TRANSVERSE LOCATION
BY ACTION OF WEDGES 2

United States Patent Office 3,186,916
Patented June 1, 1965

3,186,916
SOLID MODERATOR CORE STRUCTURES FOR NUCLEAR REACTORS
Roderick Taylor, Newcastle-upon-Tyne, England, assignor of one-half to The Nuclear Power Plant Company Limited, Newcastle-upon-Tyne, England
Filed Sept. 27, 1960, Ser. No. 58,831
Claims priority, application Great Britain, Sept. 29, 1959, 33,080/59
7 Claims. (Cl. 176—85)

This invention relates to solid moderator core structures for nuclear reactors.

It is of particular application to graphite moderator core structures as used in large gas cooled natural uranium nuclear reactors for power production. Such graphite core structures usually consist of an assembly of graphite blocks arranged in successive horizontal layers to form a series of vertical columns of blocks. The core has an active portion in which the nuclear fuel is located and this is surrounded by a reflector portion which does not contain nuclear fuel.

In the active portion the blocks have cylindrical holes formed therein in which fuel elements are located and through which cooling gas can flow over the surface of the fuel elements, the holes of each block in a vertical column being aligned with one another to form a continuous channel through the core.

The whole of the core structure is supported on a steel base plate and is held together by means of elastic restraints spaced vertically at suitable intervals around the periphery of the core.

Under irradiation the graphite may grow or shrink depending on the conditions. The growth of the graphite is anisotropic and it can to some extent be compensated by the use of graphite tiles disposed between the blocks, which are orientated with respect to each other so that the effect of growth is minimised.

As the operating temperature of the graphite is increased, however, shrinkages occur which may offset any compensating effect which can be achieved by the use of tiles in the way described.

Between the steel base plate and the core differential expansion occurs. To allow for this it is usual to mount ball bearings between the bottom layer of the core and the base plate so that relative movement between core and base plate can take place.

A disadvantage of this arrangement is that as the steel expands relative to the core, misalignment is produced between the channels in the core and corresponding holes in the base plate through which cooling gas flows into the core channels. A limit is thus placed on the maximum diameter of the core for a given gas inlet temperature since the range of allowable movement is restricted by the choice of pitch of the fuel channels.

The object of the present invention is to provide a solid moderator core structure for a nuclear reactor which core structure can be keyed solidly to the supporting base plate and also provide compensation for irradiation growth or shrinkage and for differential thermal expansion.

The invention consists in a solid moderator core structure for a nuclear reactor comprising an assembly of blocks of neutron moderating material which mutually support each other within a constraining framework which restricts movement of the blocks in directions parallel to a chosen plane, at least some of said blocks each having opposed end portions which have mutually inclined plane surfaces formed thereon through which surfaces all forces acting on the blocks affecting their transverse geometry are transmitted to adjacent blocks and thence to the constraining framework, the blocks being free to move relative to one another and to the constraining framework in a direction perpendicular to the chosen plane so as to maintain a fixed spacing between the blocks in directions parallel to the said chosen plane.

The invention also consists in a core structure in accordance with the preceding paragraph in which the core is built up of a series of spaced vertical columns of blocks of moderating material, dynamic columns of blocks alternating with static columns in mutually perpendicular directions in the horizontal plane, so that substantially each dynamic column is surrounded by four static columns and vice versa, the blocks in a dynamic column having at each end thereof mutually inclined plane surfaces which are in sliding contact with corresponding surfaces on wedge shaped members located between the blocks, said wedge shaped members having vertical plane faces in sliding contact with vertical faces of blocks in the static columns, said members permitting relative movement in a vertical direction between adjacent blocks of a dynamic column.

The invention also consists in a core structure in accordance with the preceding paragraph in which the wedge shaped members bear against spacing blocks separating adjacent blocks in the static column.

The invention also consists in a core structure in accordance with either of the preceding two paragraphs in which the faces of the wedge shaped members in sliding contact with faces on the blocks of the static column fit into recesses in said blocks.

The invention also consists in a core structure in accordance with any of the preceding three paragraphs in which at least in the portion of the core containing nuclear fuel all the columns are dynamic columns, each pair of adjacent blocks in a column being separated by two wedge shaped members on opposite sides of the blocks, said wedge shaped members having vertical faces in sliding contact with vertical faces located in recesses in blocks of adjacent dynamic columns, corresponding blocks in adjacent columns being turned through ninety degrees with respect to one another.

The invention also consists in a core structure in accordance with any of the preceding five paragraphs in which dynamic columns having holes therein for the passage of cooling fluid have cylindrical gas seals incorporated therein to prevent leakage of coolant between adjacent blocks.

The invention also consists in a core structure in accordance with the first of the preceding six paragraphs in which the blocks are arranged in a series of layers, each end of a block having mutually inclined plane surfaces which are in sliding contact with corresponding surfaces of four adjacent blocks in each adjacent layer.

The invention also consists in a core structure substantially as described below with reference to the accompanying drawings in which.

Figure 1:
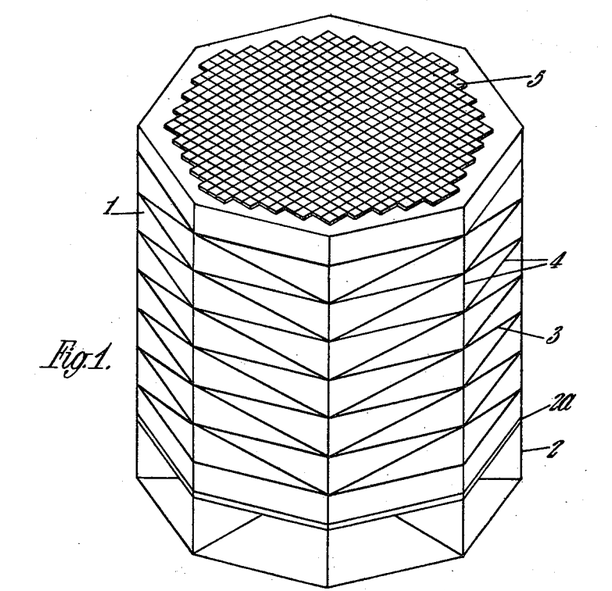
FIGURE 1 shows an isometric diagrammatic view of a graphite moderator core structure in accordance with one form of the present invention.

In carrying the invention into effect in the forms illustrated by way of example and referring first to FIGURE 1, a graphite core structure 1, hereinafter referred to as the "core" of a gas cooled nuclear reactor, is in the form of an upright prism of regular polygonal cross-section and is composed of prismatic graphite blocks stacked in horizontally disposed layers so as to form vertical columns of moderator. For the sake of simplicity the graphite blocks are not shown individually in FIGURE 1.

The core comprises essentially two portions, an inner active portion in which the vertical columns of blocks are penetrated by cylindrical holes containing nuclear fuel and coolant and an outer reflector portion surrounding the active portion composed mainly of solid blocks. The core is supported on a base plate 2a forming part of a diagrid structure 2 which is in turn supported by a pressure vessel, not shown, enclosing the core. The core is radially confined by restraints 3 whose function is to maintain a stable core lattice geometry. The restraints 3 themselves may be confined by a surrounding cage-like structure 4 to provide stability for the whole core in planes transverse to the vertical axis and at the same time allows predetermined motion of the core.

On top of the core is a charge pan assembly 5 which provides a location for fuel handling and reactor control mechanisms, fission product detection means and ancillary monitoring equipment for example coolant thermocouples. The assembly may be supported directly by the top layer of graphite blocks or else above this layer from the cage 4 surrounding the core as shown.

From the charge pan assembly it is implied that the core has a square lattice, but this is not an essential feature in any of the various forms of the invention to be described below.

Figure 2:
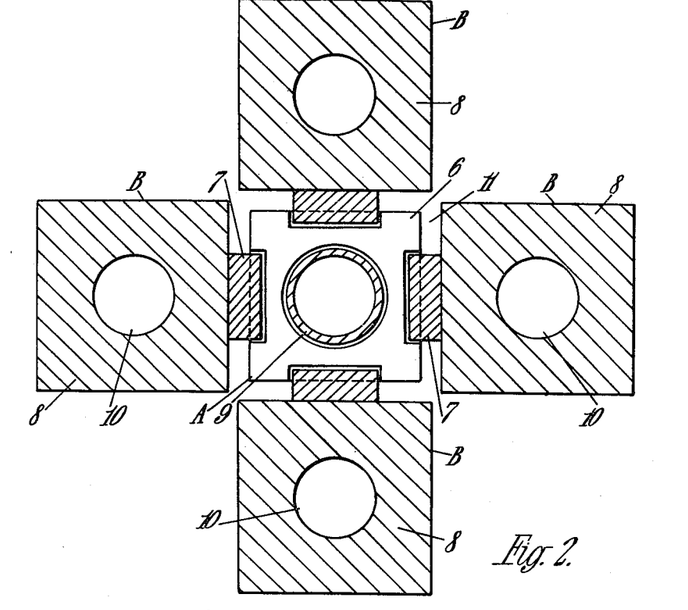
FIGURE 2 is a plan view of five vertical columns of graphite blocks linked and arranged with respect to one another in accordance with one form of the invention and is a plan view on line X—X of FIGURE 3.
Figure 3:
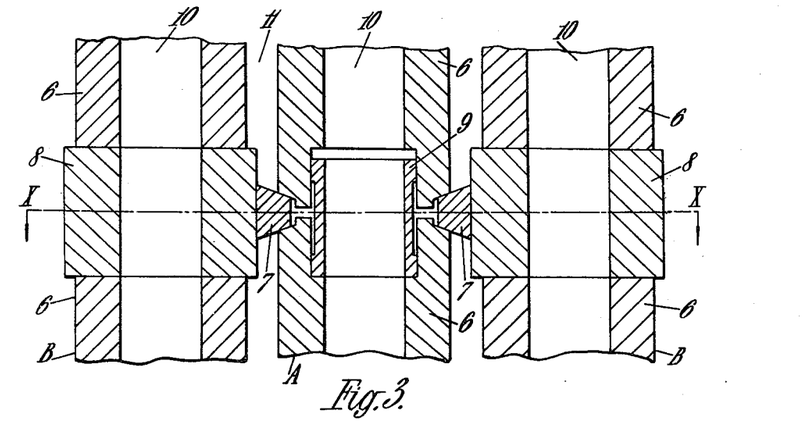
FIGURE 3 is a sectional elevation of part of the length of the columns of FIGURE 2.

Referring to FIGURES 2 and 3 graphite blocks 6 are arranged in a series of spaced vertical columns of which five only are shown for the purpose of explanation. Whilst all the columns may be alike this is not necessary. The arrangement shown consists of a dynamic column of blocks A in which provision is made for the individual blocks to move vertically with respect to one another and static columns B in which no such provision is made. Static columns B alternate with dynamic columns A in two mutually perpendicular directions in the horizontal plane so that every dynamic column is surrounded by four static columns and vice versa except at the boundary of the core. The blocks 6 in the static columns have flat ends except for keyways as described later with reference to FIGURE 9.

Spacing each dynamic column from its adjacent static column and each block in the dynamic column from its adjacent block in that column, are four sliding wedges 7 the sloping faces of which slide on corresponding sloping faces of each block in the dynamic column and straight faces of which bear against spacing blocks 8 which are located between adjacent blocks 6 in the static columns. The blocks 8 are larger in cross-section than the blocks 6 in the static column but this is not essential. Between adjacent blocks 6 of the dynamic column are arranged gas seals 9 which permit axial displacement of adjacent blocks relative to one another in the dynamic column and at the same time minimise the leakage of cooling gas from coolant containing cylindrical holes 10 to the inter block spaces 11.

The wedges 7 provide lateral restraining forces on the blocks in the dynamic column to prevent significant changes in the spacing between centre lines of adjacent columns of blocks.

Each block of the dynamic columns in the active portion of the core is, in the form shown, a right vertical prism of graphite with its upper and lower ends shaped to accommodate the wedges 7 which are also of graphite. Whilst the blocks are shown square-shaped they may be polygonal. The wedges slide radially under the action of axial compression and as mentioned above bear against the faces of adjacent columns which, in the form illustrated, are static columns. The blocks of the dynamic column in the reflector portion of the core are the same as in the active portion except that they are solid as they do not need to contain a cylindrical hole 10 for fuel and coolant.

Figure 4:
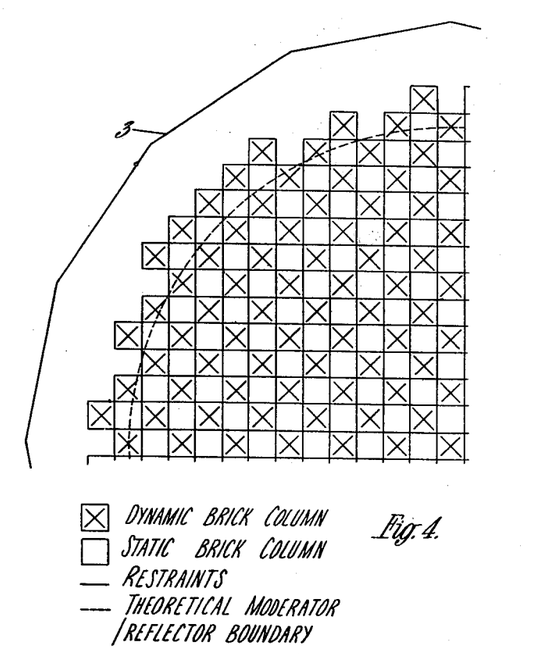
FIGURE 4 is a diagrammatic plan of a quadrant of the core structure with the block arrangement of FIGURES 2 and 3.

At the boundary of the core it is necessary to provide means for transmitting the wedging forces from the outermost dynamic columns to the peripheral restraints 3. The positions of these outermost dynamic columns are shown in FIGURE 4 in which a quadrant of the core is shown diagrammatically, the squares containing a cross representing dynamic columns and the remainder static columns. A dotted line represents the theoretical outer boundary of the active portion of the core and the portion between the dotted line and the peripheral restraint 3 is the reflector portion which is comprised mainly of solid blocks.

Figure 5:
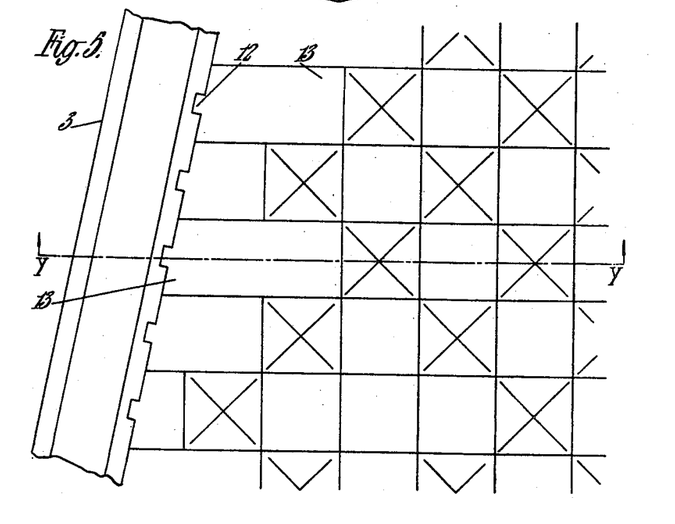
FIGURE 5 shows diagrammatically in plan, details of peripheral restraints used with the arrangement of FIGURES 2–4.

FIGURE 5 shows a cross section of the restraint 3 containing a number of grooves into which fit projections 12 on graphite members 13 which transmit the wedging forces exerted on the outermost dynamic columns A to the restraint 3. With the arrangement shown the restraints 3 determine the transverse geometry of the core that is to say the geometry in a plane at right angles to the vertical axis of the core.

Figure 6:
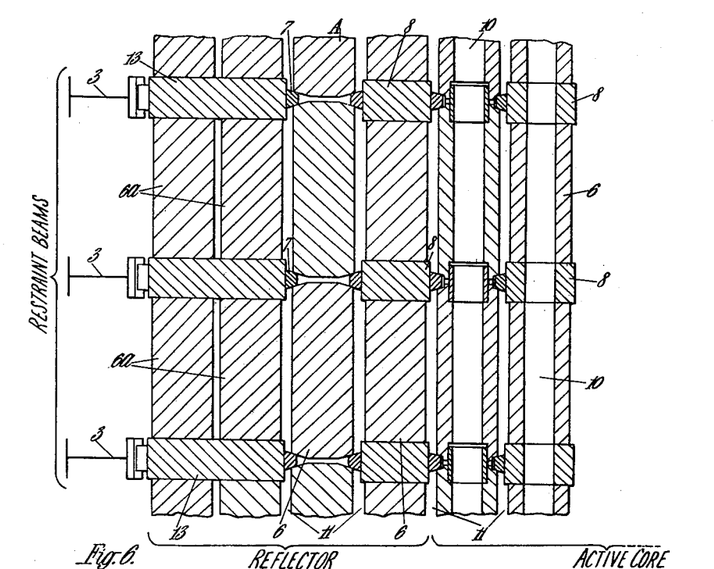
FIGURE 6 is a sectional elevation through columns of blocks in both active and reflector portions of the core structure.

The arrangement of FIGURE 5 is shown in elevation in FIGURE 6 the view being along a line corresponding to Y—Y of FIGURE 5. The members 13 correspond in thickness in this case to the blocks 8 in the static columns and are spaced by blocks 6a of the same vertical height and shape as blocks 6 in the static columns. The blocks 6a which form part of the reflector portion of the core are solid as are the blocks 6 and 8 in the reflector portion. In the dynamic column A in the reflector portion the fact that the blocks 6 are solid means that gas seals 9 can be dispensed within this and similar columns in the reflector portion.

With the construction described and illustrated in FIGURES 1-6 there is freedom of vertical motion between adjacent blocks of a dynamic column and also between adjacent columns. This freedom which is only restricted by frictional forces permits movement to take place between columns and between respective blocks of dynamic columns as a result of differential irradiation growth, differential thermal expansion, or other dimensional changes which may manifest themselves in the core.

The spacing of adjacent columns from one another leaving clearance 11 permits irradiation growth or shrinkage in directions transverse to the vertical axis of the core. The wedges 7 also act as keys between adjacent blocks in a dynamic column to prevent misalignment between the holes 10 for fuel and coolant.

The static columns are locked by separate means which will be referred to below.

Figure 7:
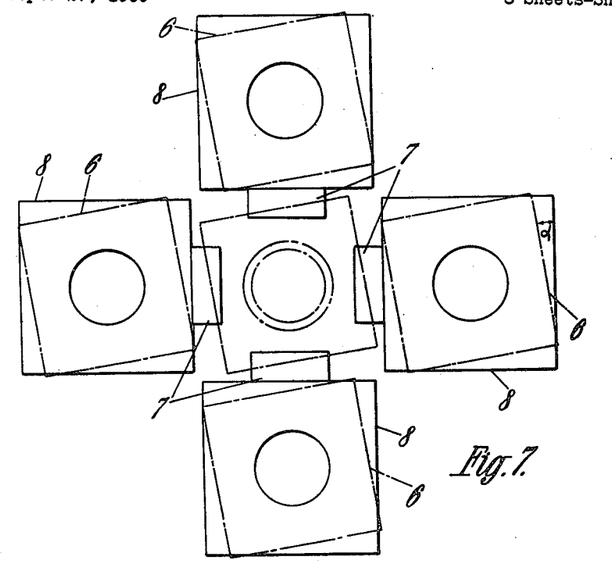
FIGURE 7 is a plan view of five vertical columns arranged in accordance with FIGURES 2-4 showing block orientation in relation to lattice geometry.

The spaces between the adjacent columns would, if arranged as shown for the sake of simplicity in FIGURES 1–6 provide continuous straight paths through the core for neutrons, reducing the efficiency of the moderator and in practice it is necessary so to orientate the blocks in adjacent columns that the paths for neutrons between adjacent columns are discontinuous. The orientation or twisting of the blocks is shown exaggerated in FIGURE 7. The twisting in adjacent blocks of a column is of opposite hand. By making the blocks 8 of larger cross section than the blocks 6 a firm support is provided between adjacent blocks despite their relative twist.

Figure 8:
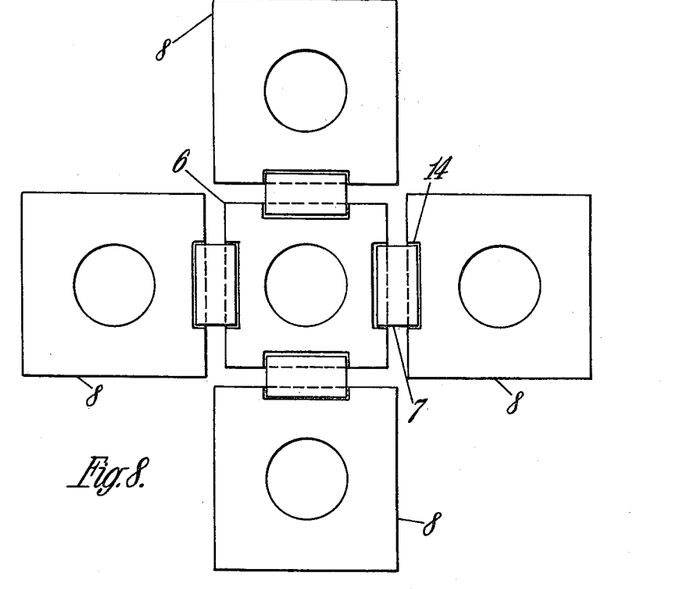
FIGURE 8 shows in plan view an arrangement similar to that of FIGURE 2 but in which adjacent columns are locked together.

Instead of the wedges 7 abutting the faces of the members 8 in the way shown in FIGURES 1–7 adjacent columns can be locked together to oppose transverse movement of the columns relative to one another by forming recesses in the faces of the member 8 into which the wedges can fit. This construction is shown in FIGURE 8 where the orientation or twisting of the block is omitted for simplicity. The recesses are indicated by the reference numeral 14.

Figure 9:
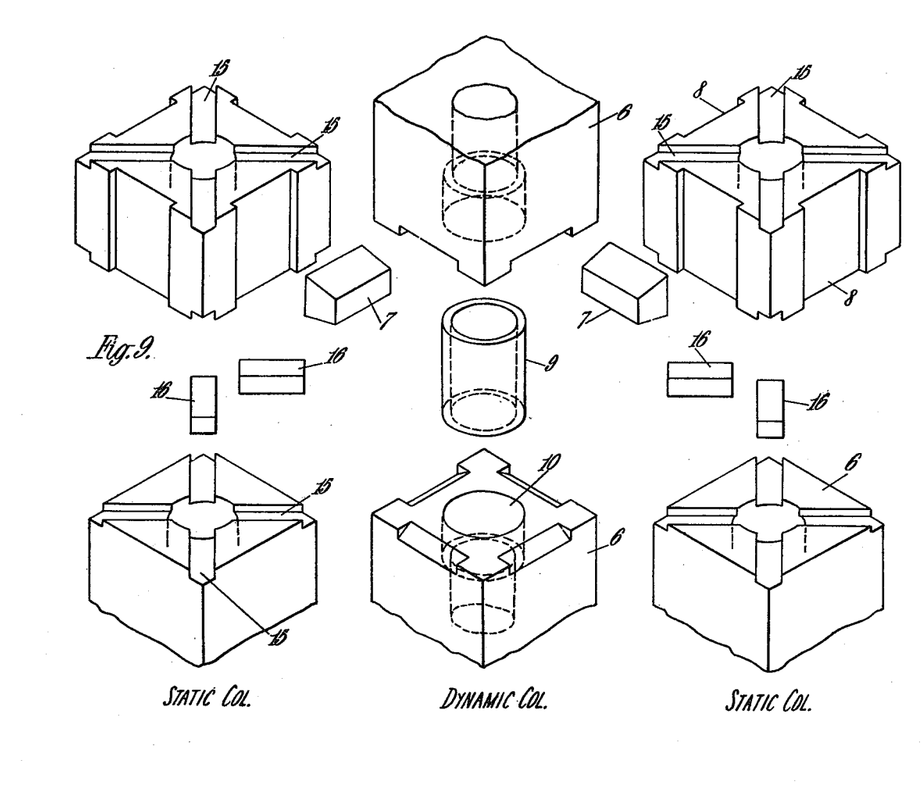
FIGURE 9 is an "exploded" or developed isometric view of the arrangement of FIGURE 8.

The shapes of the various blocks, wedges and gas seals are shown in FIGURE 9. Two adjacent blocks of a dynamic column are shown in the centre and two adjacent blocks of a static column are shown on either side of the dynamic column. FIGURE 9 also shows how misalignment of the holes 10 in the static column can be restricted. This is achieved by means of keyways 15 and keys 16.

Figure 11:
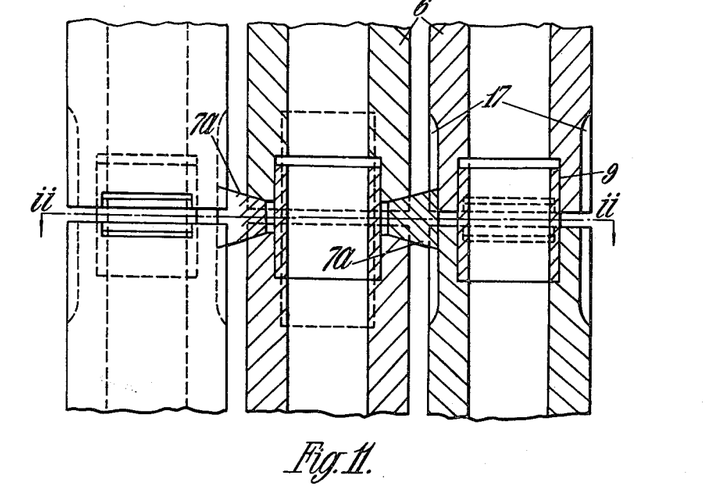
FIGURE 11 is an elevation on line i—i of FIGURE 10.
Figure 12:
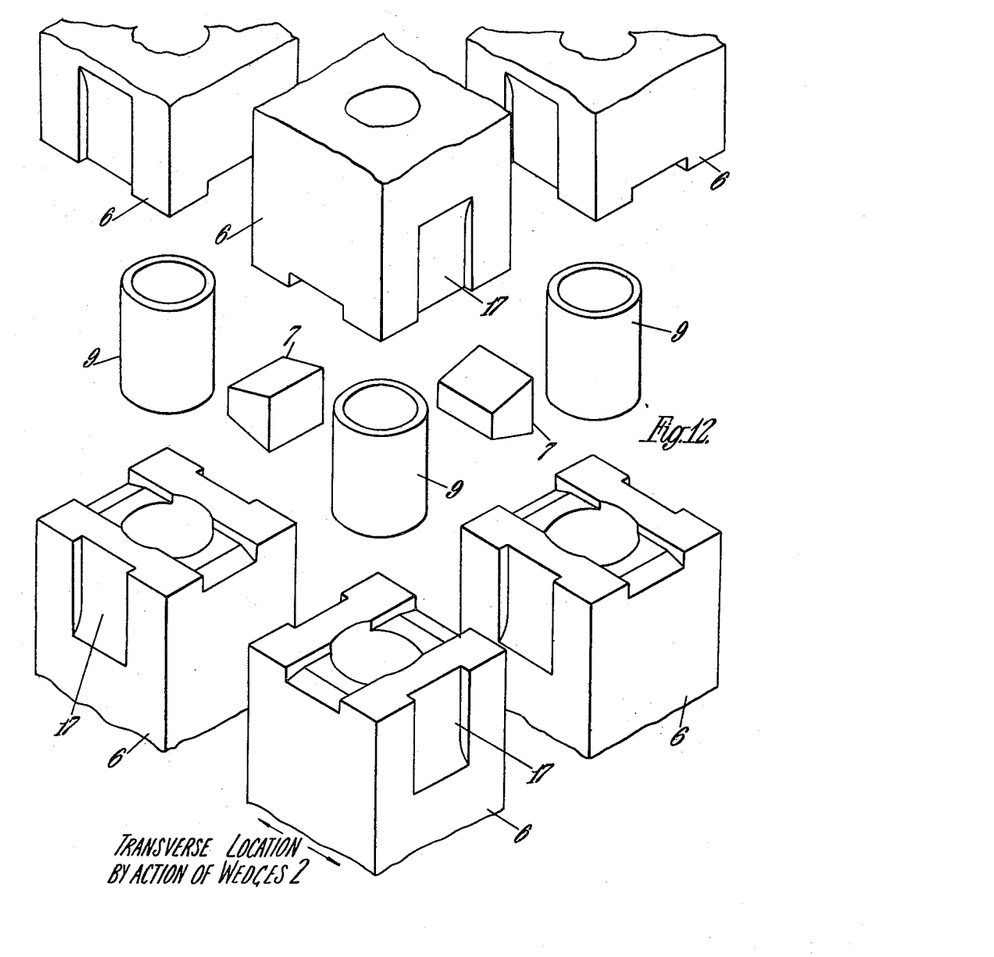
FIGURE 12 is an "exploded" or developed isometric view of the arrangement of FIGURES 10 and 11.
Figure 13:
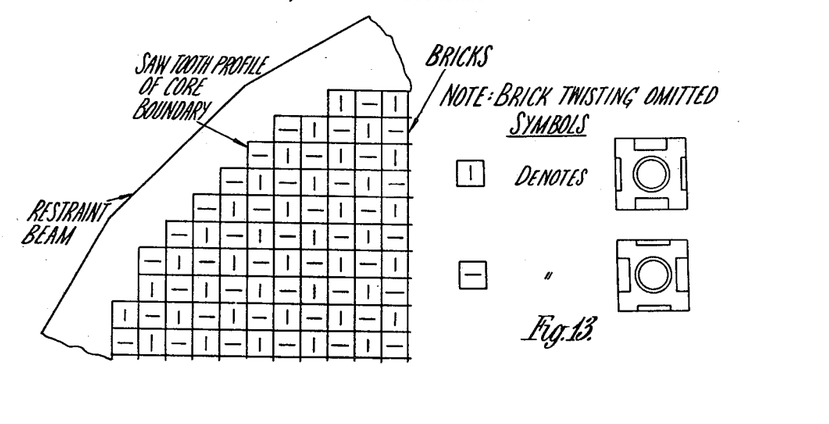
FIGURE 13 shows a diagrammatic view in plan of a portion of the core with the arrangement of FIGURES 10-12.

In an alternative form of the invention illustrated in FIGURES 11–13 the use of alternate static and dynamic columns is replaced by a system consisting entirely of dynamic columns with the possible exception of the reflector portion where it may be desirable to employ static columns.

Figure 10:
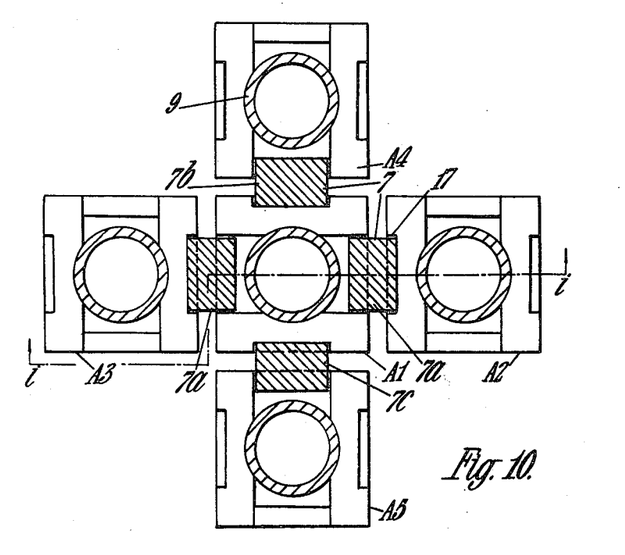
FIGURE 10 shows a plan view of five columns of blocks arranged in accordance with a second form of the invention and is a plan on line ii—ii of FIGURE 11.

In this form two adjacent blocks of a column are separated by two wedges 7a instead of four in the previously described forms. In FIGURE 10 five columns A1, A2, A3, A4, A5 are shown all of which are dynamic columns and as can be seen from FIGURE 11 adjacent blocks in column A1 are separated by wedges 7a. These wedges also slide in slots 17 cut in the blocks of adjacent columns A2, A3 the slots and the corresponding wall of the wedges having vertical faces as can best be seen in FIGURE 12.

Adjacent blocks of column A4 are separated by two wedges 7b of which only one is shown in FIGURE 10. An identical wedge is, however, located on the opposite face of the blocks of column A4 shown in FIGURE 10. Adjacent blocks of column A5 are likewise separated by two wedges 7c of which only one is shown in FIGURE 10. The blocks of column A1 have recesses 17 formed therein to receive the wedges 7b and 7c. The blocks of each column are all identical as can be seen in FIGURE 12, but by arranging for corresponding blocks in adjacent columns to be turned through ninety degrees with respect to one another only two sliding wedges 7 are needed between each adjacent pair of blocks in a given column. Gas seals 9 are required between each pair of adjacent blocks in a column.

FIGURE 13 shows in diagrammatic form the orientation of blocks in adjacent columns.

Figures 14A, 14B, 14C:
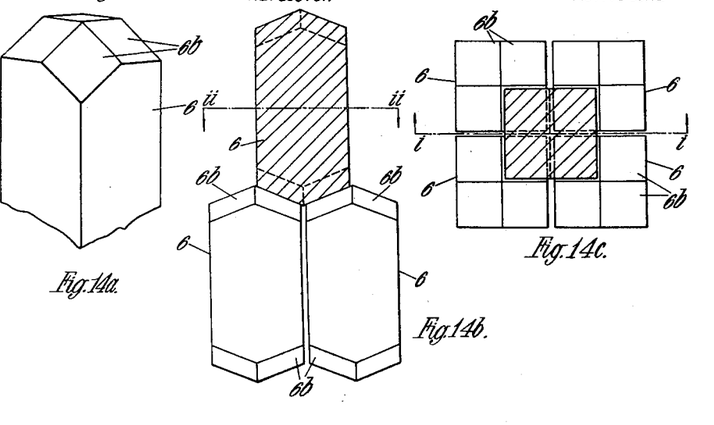
FIGURES 14a, 14b, 14c show respectively an isometric view, an end elevation and a plan view of a block shaped in accordance with a third form of the invention, FIGURE 14b being an elevation on line i—i of FIGURE 14c and FIGURE 14c being a plan on line ii—ii of FIGURE 14b.

A third form of the invention is shown in FIGURES 14a, 14b and 14c. In this form each block 6 has four sloping faces 6b at each end thereof as shown in FIGURE 14a. The blocks are stacked as shown in FIGURE 14b in staggered relationship in successive horizontal layers. The use of sliding wedges is thus eliminated as the blocks exert wedging faces directly on one another. This form of the invention is suitable for a reactor construction in which the nuclear fuel is totally enclosed in a block, cooling fluid being circulated between adjacent blocks to remove heat developed therein.

Holes could be formed to house the fuel as shown in the previous forms, but in view of the staggered relation of the blocks it would be necessary for the corner of the blocks to be formed into arcuate shape so that the four adjacent corners of four blocks would form a cylindrical hole. Gas seals would then be necessary for the full length of the channel to prevent leakage of the cooling fluid.

All the constructions described permit the lower block of each column to be keyed to the supporting base plate and this prevents displacement between the holes 10 of the columns and corresponding holes in the base plate through which coolant enters the core. By making the restraints 3, the supporting base plate and the charge pan assembly of the same material differential thermal expansion can be substantially eliminated. There is thus no need for any frictionless bearings between the core and the supporting base plate. The top block in the column can similarily be keyed to the charge pan assembly or to the supporting cage which again prevents misalignment of the holes 10 and corresponding holes in the charge pans.

With the various forms of the invention described growth or shrinkage of the moderator block can occur without affecting the lattice pitch. The lattice pitch is controlled by peripheral restraints so that the core follows any thermal or other movement of the restraints. As a consequence there is no need for means to permit relative movement between the core and the supporting base plate. Further as mentioned above irradiation growth in planes transverse to the vertical axis is allowed for by having the blocks spaced from one another in these planes.

The direction in which movement between adjacent blocks of a column is allowable need not necessarily be a vertical direction and the invention may be applied to cores with the holes for fuel and coolant disposed in horizontal or other planes provided there are forces acting on the blocks to generate the wedging forces.

The invention is not limited to the use of graphite as moderator but may be used with cores of other materials for example beryllium.

I claim:

1. In a solid moderator core structure for a nuclear reactor comprising an assembly of blocks of neutron moderating material arranged in columns the axes of which are substantially parallel and a constraining frame work around the periphery of the assembly to apply forces to said assembly to restrict movement of said blocks in the lateral direction that is in a direction transverse to the axes of the columns, said blocks having side faces and end faces, the end faces being disposed transversely with respect to said column axes, the side faces of adjacent blocks being spaced apart from each other to provide spacing of the blocks in the lateral direction, the provision on opposed end faces of adjacent blocks in at least some of the columns of mutually inclined plane surfaces, the mutually inclined surfaces in each such block intersecting said sides of the block at places lying in planes perpendicular to the axis of the block and which intersect said axis at points lying within the block, said inclined plane surfaces co-acting with the inclined surfaces of adjacent blocks to transmit all forces acting on the blocks in the lateral direction to adjacent blocks in the said direction and thence to the constraining frame work and at the same time allowing the blocks to move relative to one another in the direction of the axes of columns to maintain a fixed lattice pitch between corresponding axes in the blocks parallel to the column axes.

2. A core structure as claimed in claim 1 in which the blocks are arranged in a series of layers, the mutually inclined plane surfaces being in sliding contact with corresponding surfaces of four adjacent blocks in each adjacent layer.

3. A solid moderator core structure for a nuclear reactor comprising an assembly of blocks of neutron moderating material of square cross-section, the blocks being assembled in vertical columns spaced apart from each other in the horizontal direction, a constraining framework around the periphery of said block assembly exerting constraining forces to restrict movement of the blocks in a horizontal direction, the columns of blocks being of two types, namely, a dynamic type in which the blocks of the column can move vertically relative to one another and a static type in which the blocks do not move vertically relative to one another, the dynamic columns alternating with static columns so that each dynamic column is surrounded on four sides by static columns and wedge shaped members interposed between end faces of adjacent blocks in a dynamic column, the blocks in a dynamic column having at each end thereof mutually inclined plane surfaces which are in sliding contact with corresponding surfaces of the wedge shaped members and the wedge shaped members having vertical plane faces in sliding contact with vertical faces of blocks in the static columns, said wedge shaped members permitting relative movement in a vertical direction between the adjacent blocks of the dynamic column.

4. A core structure as claimed in claim 3 in which the wedge shaped members bear against spacing blocks separating adjacent blocks in the static column.

5. A core structure as claimed in claim 3 in which the faces of the wedge shaped members in sliding contact with faces on the blocks of the static column fit into recesses in said blocks.

6. A solid moderator core structure for a nuclear reactor comprising an assembly of blocks of neutron moderating material of square cross-section, the blocks being assembled in vertical columns spaced apart from each other in the horizontal direction, a constraining framework around the periphery of said assembly exerting constraining forces to restrict movement of the blocks in a horizontal direction, the core, in at least the nuclear fuel containing part, consisting solely of dynamic columns of blocks in which blocks of a column can move vertically relative to one another, end faces of each block of a column having two mutually inclined surfaces said mutually inclined surfaces being on two opposite sides of the block and intersecting the sides of the block at places lying in planes perpendicular to the axis of the block and intersecting said axis at points lying within the block whilst the two remaining sides of the block have vertical recesses formed therein, each pair of adjacent blocks in a column being separated by two wedge shaped members of trapezoidal cross-section which engage with their inclined faces the inclined faces of adjacent blocks and which engage with one of their straight vertical faces recesses in the blocks of adjacent dynamic columns, corresponding blocks in adjacent columns being turned about their axes through ninety degrees with respect to one another.

7. A core structure as claimed in claim 6 in which dynamic columns having holes therein for the passage of cooling fluid have cylindrical gas seals incorporated therein to prevent leakage of coolant between adjacent blocks.

References Cited by the Examiner
UNITED STATES PATENTS

| 2,852,457 | 9/58 | Long et al. | 176—84 |
| 2,907,706 | 10/59 | Horning et al. | 176—21 |
| 2,998,364 | 8/61 | Stubbs et al. | 176—84 |
| 3,010,888 | 11/61 | Battle | 176—84 |
| 3,020,226 | 2/62 | Hackney | 176—84 |
| 3,115,448 | 12/63 | Hackney et al. | 176—85 |

FOREIGN PATENTS 1,198,353  6/59  France.

CARL D. QUARFORTH, *Primary Examiner.*
ROGER L. CAMPBELL, *Examiner.*